United States Patent [19]

Asbury, III

[11] Patent Number: 4,676,628
[45] Date of Patent: Jun. 30, 1987

[54] METHOD AND APPARATUS FOR ANALYZING AND PRINTING COLOR PHOTOGRAPHS

[76] Inventor: Louis H. Asbury, III, 1711 Brandon Rd., Charlotte, N.C. 28204

[21] Appl. No.: 830,016

[22] Filed: Feb. 18, 1986

[51] Int. Cl.⁴ .................................... G03B 27/80
[52] U.S. Cl. .................................... 355/38; 355/35; 355/77
[58] Field of Search ............. 355/35, 38, 32, 77

[56] References Cited

U.S. PATENT DOCUMENTS

| | | | |
|---|---|---|---|
| 3,097,563 | 7/1963 | Weisglass | 355/38 |
| 3,588,246 | 6/1971 | July | 355/38 |
| 3,674,364 | 7/1972 | Korman | 355/38 |
| 4,263,001 | 4/1981 | Deutsch | 355/77 |
| 4,371,259 | 2/1983 | Howitt | 355/38 |

Primary Examiner—Monroe H. Hayes
Attorney, Agent, or Firm—Daniel E. McConnell

[57] ABSTRACT

This invention relates to the printing of color photographs onto photographic paper from color negatives, and more particularly to a method and apparatus for analyzing the color correction values necessary to achieve printing of such negatives in such a way as to produce a finished print having acceptable color rendition. A method and apparatus are contemplated by which an operator may directly view a color image of a negative from which printing is to occur and directly observe the effects on printing of variations in the spectral content of light to be used for printing. By determining the specific spectral response of a lot of printing paper, a standard correction may be established which will significantly reduce the need for trial by error correction of the printing process, effecting a saving in materials and supplies as well as in time.

14 Claims, 3 Drawing Figures

METHOD AND APPARATUS FOR ANALYZING AND PRINTING COLOR PHOTOGRAPHS

FIELD AND BACKGROUND OF INVENTION

This invention relates to the printing of color photographs onto photographic paper from color negatives, and more particularly to a method and apparatus for analyzing the color correction values necessary to achieve printing of such negatives in such a way as to produce a finished print having acceptable color rendition.

Persons familiar with color photography are familiar with the difficulty in obtaining a print which gives an acceptable color rendition of a scene originally photographed. While such difficulties are overcome to the extent necessary for color photography to have become a major industry, they remain and are most noticeable in the preparation of high quality prints from color negatives. In particular such problems arise from the variables inherently present in the color photographic process and relating to the variations in spectral response characteristics of lots of printing paper and the effects of processing variables such as chemical strength, temperatures and processing times and negative base materials. The skilled practitioner of color photographic processes will typically buy printing paper in large lots in order to stabilize the variable of lot variations, and closely control chemical strengths, temperatures and processing times. Even so, the conventional practice of the art requires that sample prints (often from "standard" negatives) be prepared daily or more often in order to confirm that acceptable color balance and rendition will be achieved in printing from color negatives.

One technical advance which has made such adjustment in processing more acceptable and lessened the need for extensive sampling in order to achieve acceptable color renditions has been the development of color printers such as that shown in U.S. Pat. No. 4,371,259 issued Feb. 1, 1983 to Howitt. As there described, it is possible to provide a colorhead means which is capable of emitting light of determinable spectral content. Such a colorhead has significantly supplanted the prior practices of preparing filter packs to be inserted optically between a light source and printing paper in order to achieve the desired printing capability, as changes in the characteristics of emitted light are much more easily accomplished. However, even with the use of such a colorhead, determination of the variables appropriate to printing from a color negative has remained a trial and error procedure.

BRIEF DESCRIPTION OF INVENTION

With the foregoing in mind, it is an object of this invention to facilitate the preparation of color photographic prints from color negatives by enabling an operator to more readily analyze the actions necessary to correct for differences in negatives and thereby achieve an acceptable color rendition. In realizing this object of the present invention, a method and apparatus are contemplated by which an operator may directly view a color image of a negative from which printing is to occur and directly observe the effects on printing of variations in the spectral content of light to be used for printing. By determining the specific spectral response of a lot of printing paper, a standard correction may be established which will significantly reduce the need for trial by error correction of the printing process, effecting a saving in materials and supplies as well as in time.

Yet a further object of this invention is to provide an apparatus which combines electronic video technology with the technology of colorheads such as that mentioned above and thereby achieves a preview or display capability enabling more efficient use of color photographic laboratory facilities. In realizing this object of the present invention, a color video camera and display are incorporated with a colorhead in such a way as to permit an operator to preview the effect on printing of changes in the spectral characteristics of light transmitted through a color negative, by compensating for the different spectral response characteristics of the printing paper and the video camera.

Yet another object of this invention is to accomplish printing of color photographs in accordance with a method in which compensation for the differing spectral response characteristics of a video camera and photographic printing paper occurs by either variation in the spectral characteristics of light transmitted through a negative during previewing and during printing or variation in the electronic characteristics of an electronic video signal generated by a video camera and received by a video display. In either instance, such variation is, in accordance with the present invention, known and thus useful in assuring that the color rendition achieved on printing is acceptable.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described, more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
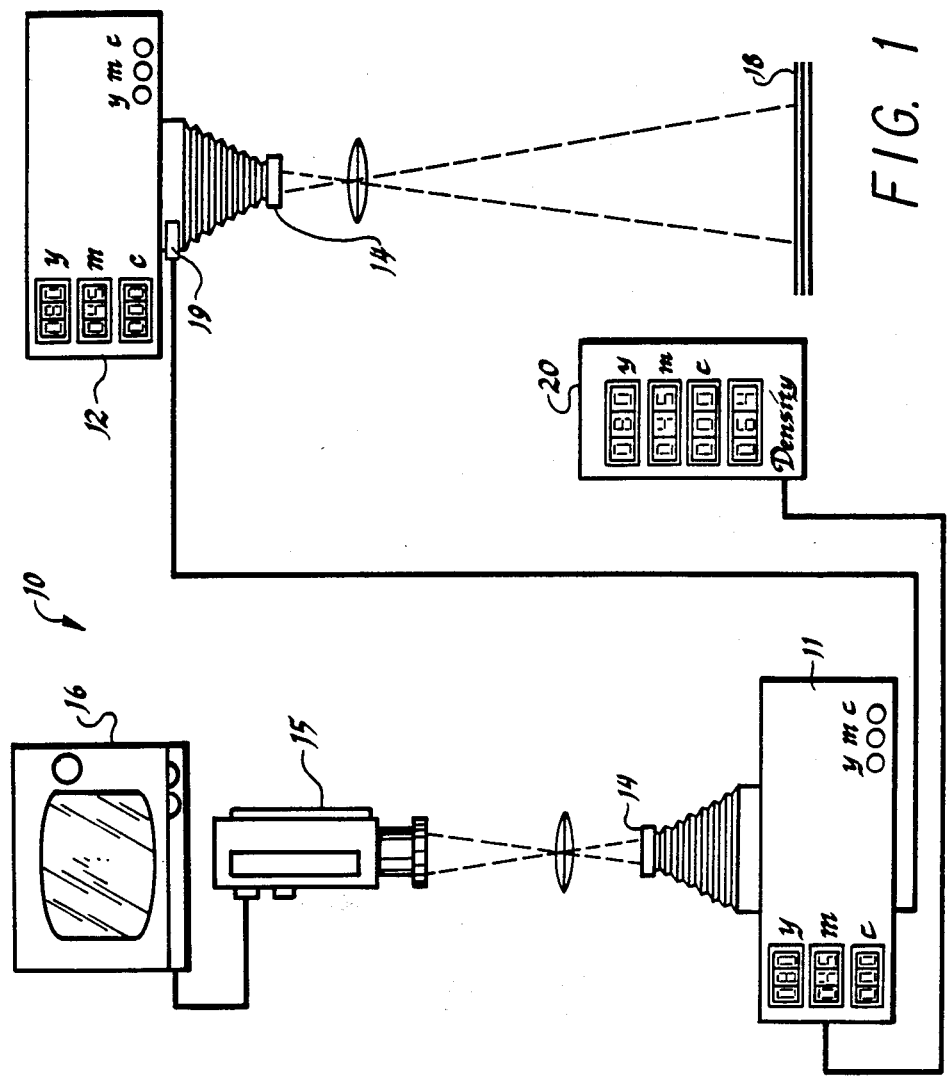
FIG. 1 is a schematic elevation view of a first form of apparatus in accordance with this invention.

Referring now more particularly to FIG. 1, the apparatus there shown includes a video analyzer and a color printer, all generally indicated at 10. As will become more clear from the disclosure which follows, it is not necessary to the present invention that all elements illustrated in FIG. 1 be included in an apparatus as contemplated by this invention, although the use of the illustrated components is deemed preferable.

The apparatus as illustrated includes a pair of colorhead means 11, 12, each of which may be constructed as contemplated by the aforementioned Howitt patent or may be any operationally comparable device. What is significant is that the color head means 11, 12 be capable of emitting light of determinable color values, and that there be provided some display means operatively associated with the colorheads for indicating the color values of the light emitted. In the form illustrated, the display takes the form of digital devices which display the content of three complementary colors such as yellow, magenta and cyan as a numerical value. Such displays make restoring a particular color value mix more simple, and facilitate the reproduction of color value mixes from one colorhead to another, all as contemplated by Howitt. However, a skilled operator knowledgable about filter packs and their assembly may oftentimes approach the capabilities of such colorheads. The Howitt colorheads, when used in the present invention, perform an optical blending, subtractive mix of light from a single source such as a lamp in achieving the emission of light having the spectral characteristics necessary for printing. Persons of skill in the printing of color photographs will know of other apparatus and methods which will be equivalents to such operations.

Light emitted from one colorhead 11 is transmitted along an optical pathway to pass through a color negative 14 and reach a color video camera means 15. As will be appreciated, the color video camera 15 has a particular spectral response characteristic, which typically is accommodated in a conventional video application to result in the generation of an electronic video signal which, when supplied to an appropriate video display such as a monitor or television receiver, results in the presentation to a viewer of a color image which is acceptable as a representation of some scene. The present invention contemplates taking advantage of the development of such video technology in new and particular ways so as to permit displaying to an operator an image which is representative of the effects accomplished by photographic printing from a negative being analyzed. The present invention contemplates that the video camera 15 may be any acceptable type presently known, used or contemplated, including CCD, MOS, vidicon, newvicon, saticon, and plumbicon cameras.

The camera 15 generates an electronic video signal in a manner well known to persons skilled in the relevant arts, and that signal is forwarded to a video display means 16 for observation by an operator. The video display means 16 may be any conventional form of color video display compatible with the camera, such as a monitor, receiver, etc. What is significant for the present invention is that the video signal generated by the camera may be received by the display and result in an operator being able to directly observe the color balance and appearance of the image produced by transmitting light through the negative 14.

Figure 2:
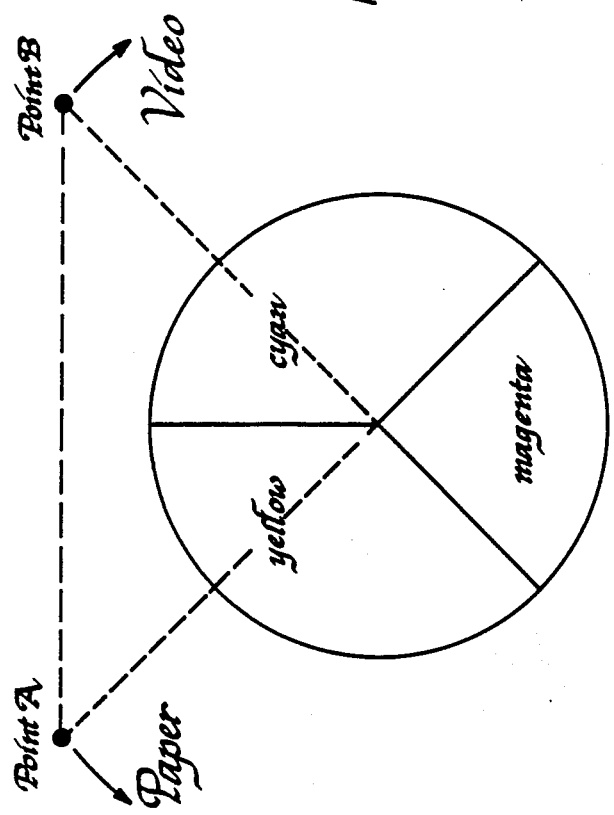
FIG. 2 is a diagrammatic representation of certain spectral response characteristic relationships.

The camera 15 is arranged to receive the light emitted from the associated colorhead 11 as transmitted through the color negative 14 to be analyzed and/or printed. In accordance with one form of the present invention, the difference in spectral response of the camera 15 and the photographic paper on which an image is to be printed is accommodated by an offset of the spectral characteristics of the light emitted by the associated colorhead 11. That is, a determination is made as to the difference between the determinable spectral response of the camera and the determinable spectral response of the paper, and the light emitted from the colorhead is then spectrally shifted by that amount. In particular, and with reference to FIG. 2, the colorhead 11 conventionally emits light which has determinable spectral content in three complementary colors, such as yellow, magenta and cyan. This is indicated in FIG. 2 by a circle dived into three equal portions, one for each of the primaries. By maintaining the spectral content of one color constant, the division of spectral content between the other two colors may be shifted in such a way that there is an equal degree of increase in one and decrease in the other. This is represented in FIG. 2 by a superposed triangle having as one point the center of the circle and as the other two points the corners A and B. By "turning" the triangle about the center point of the circle, an understanding may be gained of the equal amount of change increase and decrease described herein. Stated another way, where three variables are present, holding one constant and varying the other two by equal degrees permits establishing the total spectral content with certainty.

Applying this approach to the apparatus as described to this point, the spectral response of the paper will differ from the spectral response of the camera in a way which can be determined by holding one color constant and varying the other two in a manner described. Once the correlation has been determined for a particular lot of paper, that correlation may then be retained. Under such circumstances, the colorhead 11 may be set to emit light which, when received by the camera 15, gives a color balance response at the video display which is the same as the color balance response which would be obtained by printing the negative with the correlated (and different by the amount of the offset) spectral content to which the colorhead 12 may be set.

In the apparatus of FIG. 1, the second colorhead 12 is arranged to transmit emitted light through a negative to be printed (such as the negative 14) and project an image onto a surface of photographic paper 18 on which an image is to be developed. Where used as described above, and with a negative which has been analyzed as will be described by use of the colorhead 11, camera 15 and display 16, the second colorhead 12 may be set appropriately and printing proceed with minimal requirement for repeated approximations in order to gain an acceptable print. Indeed, where so used, it commonly happens that a first print has an entirely acceptable color balance.

In so using the apparatus as escribed to this point, an operator will arrange a negative to be analyzed in the path of light emitted from the first colorhead 11 and view the result on the video display. The operator will then adjust manually, as contemplated by Howitt, the spectral content of the light emitted from the colorhead, until such time as the color balance of the image displayed on the video display is deemed acceptable. When an acceptable color balance is reached, the values of the digital displays of spectral content are noted, and comparable value are entered at the second colorhead 12. The negative is then shifted and printing proceeds.

There are two variations on the invention as thus far described which are contemplated by the apparatus of FIG. 1. The first is the possible use of a remote probe 19 which may be located in the lamphousing of the second colorhead 12 and operatively connected with the analysis circuitry of the first colorhead 11. Through the use of such a remote probe, color matching between the two colorheads may be more completely assured. The second variation is the possible provision of an outboard remote display 20 which may display at the location of one colorhead 12 the color correction values determined by the other colorhead 11.

The present invention contemplates other and further variations on the arrangement of the apparatus and the method steps to be followed. In particular, it will be apparent to persons of skill in the relevant arts that the duplication of the colorheads 11, 12 is not entirely necessary, even though efficiency is thereby achieved. It will be appreciated that a single colorhead may be used, with the spectral content of the light emitted being set appropriately for the tasks of video analysis and paper printing. The microprocessor controls of the Howitt apparatus, as commercially available, particularly facilitate such usage by permitting an essentially switch controlled offset to be used where such related process variables as paper lot, chemical strength, temperature and processing time, and negative base tint are controlled as is the usual practice.

Figure 3:
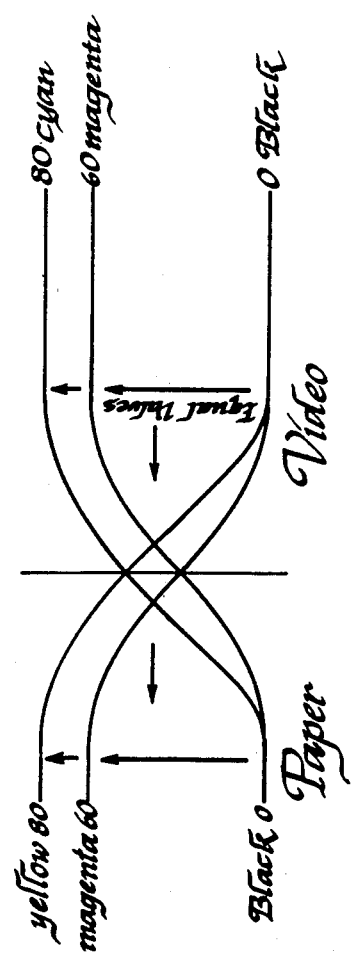
FIG. 3 is a diagrammatic representation of a second illustration of certain spectral response characteristic relationships.

An alternate approach to the use of a single colorhead (or for that matter to the use of two colorheads) accomplishes an offset electronically rather than by the spectral content of the visible light emitted. Stated differently, the band of spectral response of the video camera is more toward the blue end of the spectrum of visible light than is the case with the paper. Thus, rather than shift the spectral content of the visible light emitted by a colorhead toward the blue end to accommodate the difference, a shift may be accomplished by offsetting the electronic signals. FIG. 3 is related to such a shift, with the spectral response of photographic paper being represented toward the left side of the figure while the response of the camera is shown toward the right. Where the magenta content is held constant in the spectral distribution at the left and right ends, yellow and cyan contents shift by equal amounts as described above with reference to FIG. 2. Where an electronic offset of this type is used, an operator may adjust the spectral content of the visible light emitted by a colorhead to obtain a desired color balance on a video display, then simply swing the camera out of the lightpath and proceed to print.

In all such methods and apparatus in accordance with this invention, it is contemplated that the greatest efficiency in use will occur where the blending of light involves working with only two of three colors. Most film bases used for color negatives have an orange cast and, where subtractive color mixing is used as herein described, color balancing involves adjusting the spectral content levels of yellow and magenta. When additive color mixing is used, color balancing involves adjusting the spectral content of primary colors. Where analysis is done in accordance with this invention through the use of offsetting the spectral content of visible light, most video cameras will require that color balancing will involve adjusting the spectral content levels of cyan and magenta and deriving the spectral content of yellow therefrom. Where analysis is done in accorance with this invention through the use of offsetting the electronic signal, color balancing can be accomplished by adjusting the spectral content levels of yellow and magenta. In the latter instance, a colorhead may be used with a zero content of cyan, as is a common practice in following the procedures used prior to the development of this invention.

In the drawings and specifications there has been set forth a preferred embodiment of the invention and, although specific terms are used, the description thus given uses terminology in a generic and descriptive sense only and not for purposes of limitation.

What is claimed is:

1. An apparatus for determining the color balance appropriate for printing a color photographic print on photographic paper having determinable spectral response characteristics and comprising colorhead means capable of emitting light of determinable color values, optical means for transmitting light emitted from said colorhead means through a color photographic negative to be printed, color video camera means for receiving light transmitted through the color photographic negative to be printed and for generating an electronic video signal representative of the response of said camera means to received light, said camera means having determinable spectral response characteristics which differ from those of the photographic paper, color video display means operatively associated with said camera means for receiving a generated electronic video signal and for presenting to a viewer a visual image representation of the color photographic negative, and means operatively associated with said video camera means and said video display means for correcting for the difference between the spectral response characteristics of said camera means and the photographic paper so that the visual image representation presented to the viewer is reproduced on printing onto the photographic paper.

2. Apparatus according to claim 1 wherein said last named means offsets the color values of light emitted by said colorhead means by an amount correlated to the difference between the spectral response characteristics of said camera means and the photographic paper.

3. Apparatus according to claim 1 wherein said last named means offsets the generated electronic video signal by an amount correlated to the difference between the spectral response characteristics of said camera means and the photographic paper.

4. Apparatus according to one of claims 2 or 3 wherein said colorhead means emits light which is a blend of two of three predetermined colors.

5. An apparatus for determining the color balance appropriate for printing a color photographic print on photographic paper having determinable spectral response characteristics and comprising colorhead means capable of emitting optically blended, subtractively mixed light of determinable color values in three complementary colors, display means operatively associated with said colorhead means for indicating the color values of the light emitted by said colorhead means, manually operable means for adjusting the color values of the light emitted by said colorhead means, optical means for transmitting light emitted from said colorhead means through a color photographic negative to be printed, color video camera means for receiving light transmitted through the color photographic negative to be printed and for generating an electronic video signal representative of the response of said camera means to received light, said camera means having determinable spectral response characteristics which differ from those of the photographic paper, color video display means operatively associated with said camera means for receiving a generated electronic video signal and for presenting to a viewer a color corrected, positive visual image representation of the color photographic negative, and means operatively associated with said video camera means and said video display means for correcting for the difference between the spectral response characteristics of said camera means and the photographic paper so that the visual image representation presented to the viewer is reproduced on printing onto the photographic paper.

6. Apparatus according to claim 5 wherein said last named means comprises means for holding constant the color value of one of the three colors of light emitted by said colorhead means while adjusting the color value of the color corrected, positive visual image representation of the color photographic negative presented to a viewer by said video display means by correspondingly increasing the color value of one of the two remaining colors of light emitted by said colorhead means and decreasing the color value of the third of the colors emitted by said colorhead means, so as to correct for the differences in spectral response of the photographic paper and said camera means to light transmitted through the negative.

7. An apparatus according to claim 5 wherein said last named means comprises means for determining the effective component of said electronic video signal which is representative of one of the colors of light emitted by said colorhead means and for redirecting such component to become effective at said video display means as a representation of another one of the colors of light, so as to correct for the differences in spectral response of the photographic paper and said camera means.

8. A method of determining the color balance appropriate for printing from a color negative onto a color photographic print on photographic paper having determinable spectral response characteristics and comprising the steps of emitting light of determinable color values while indicating the color values of the light emitted, transmitting the emitted light through a color photographic negative to be printed, receiving with a color video camera light transmitted through the color photographic negative to be printed and generating an electronic video signal representative of the response of the camera to the received light, the camera having determinable spectral response characteristics which differ from those of the photographic paper, and receiving a generated electronic video signal at a color video display and presenting to a viewer a visual image representation of the color photographic negative while correcting for the difference between the spectral response characteristics of said camera means and the photographic paper so that the visual image representation presented to the viewer is reproduced on printing onto the photographic paper.

9. A method according to claim 8 wherein the step of correcting for the difference in spectral response characteristics comprises offsetting the color values of light emitted by said colorhead means by an amount correlated to the difference between the spectral response characteristics of the camera and the photographic paper.

10. A method according to claim 8 wherein the step of correcting for the difference in spectral response characteristics comprises offsetting the generated electronic video signal by an amount correlated to the difference between the spectral response characteristics of the camera and the photographic paper.

11. A method according to one of claims 9 or 10 wherein the step of emitting light comprises emitting light which is a blend of two of three colors.

12. A method for determining the color balance appropriate for printing a color photographic print on photographic paper having determinable spectral response characteristics and comprising the steps of optically blending and subtractively mixing light which has determinable color values in three colors and while indicating the color values of the light, then emitting the light and transmitting the emitted light through a color photographic negative to be printed, receiving light transmitted through the color photographic negative to be printed at a color video camera and generating an electronic video signal representative of the response of the camera to the received light, the camera having determinable spectral response characteristics which differ from those of the photographic paper, receiving the generated electronic video signal at a color video display and presenting to a viewer a positive visual image representation of the color photographic negative while correcting for the difference between the spectral response characterisics of the camera and the photographic paper, and manually adjusting the color values of the emitted light so that the visual image representation presented to the viewer achieves an acceptable color rendition to be reproduced on printing onto the photographic paper.

13. A method according to claim 12 wherein the step of correcting for the difference in spectral response characteristics comprises holding constant the color value of one of the three colors of the emitted light while adjusting the color value of the color corrected, positive visual image representation of the color photographic negative presented to a viewer by the video display by correspondingly increasing the color value of one of the two remaining colors of the emitted light and decreasing the color value of the third of the colors of the emitted light so as to correct for the differences in spectral response of the photographic paper and the camera.

14. A method according to claim 12 wherein the step of correcting for the difference in spectral response characteristics comprises determining the effective component of the electronic video signal which is representative of one of the colors of the emitted light and redirecting such component to become effective at the video display as a representation of another one of the colors of light so as to correct for the differences in spectral response of the photographic paper and said camera means.

* * * * *